Jan. 4, 1927. 1,613,084
V. H. CASEY
RESILIENT WHEEL
Filed Oct. 23, 1923
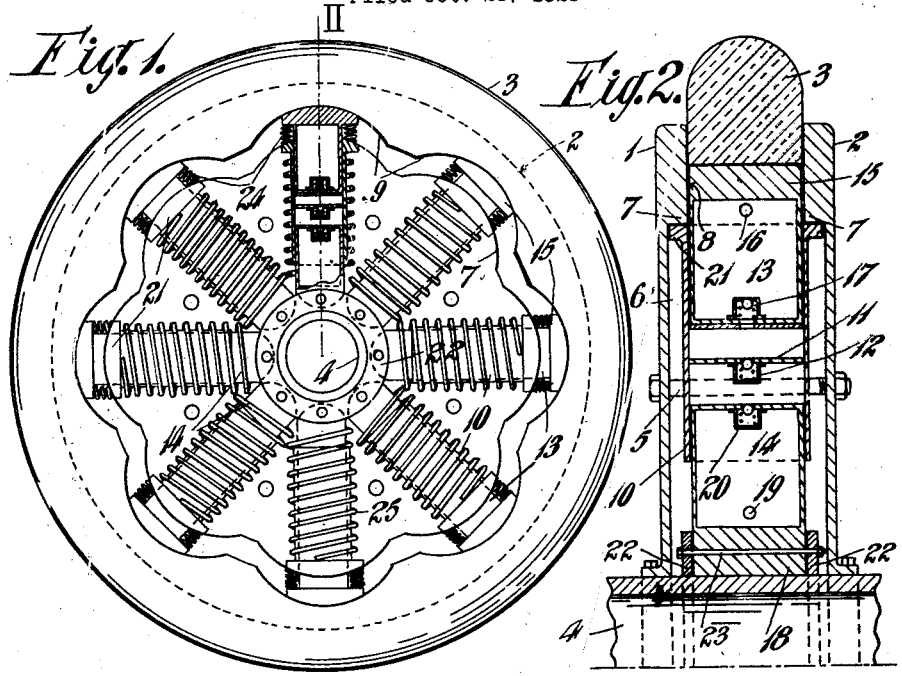
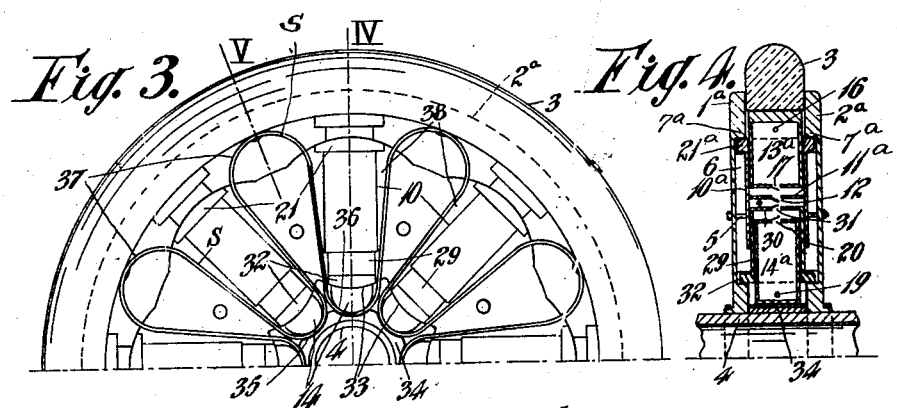
Inventor
V. H. Casey
By Marks & Clerk Attys.

Patented Jan. 4, 1927.

1,613,084

UNITED STATES PATENT OFFICE.

VERE HERBERT CASEY, OF RICHMOND, VICTORIA, AUSTRALIA.

RESILIENT WHEEL.

Application filed October 23, 1923. Serial No. 670,367, and in Great Britain November 28, 1922.

This invention refers to resilient wheels in which radially disposed pistons are employed to confine air under pressure to produce a cushioning effect on the tread and ensure sufficient resiliency in the wheel. Many devices of the kind have been designed but so far they have not come into general use owing to inefficiency, constructional difficulties and cost of manufacture. According to one known form radially disposed cylinders rigidly connected to each other are provided on a floating ring around the hub and spaced therefrom and provided with two pistons one being within the other and the connected devices are retained by side discs with scolloped shoulders bearing on shoulders on the outer piston while the inner piston engages scollops on the interior periphery of the tread.

According to this invention however each device is separate and the cylinder has shoulders bearing against shoulders on discs fixed to the hub and is unattached and divided transversely by a partition with a piston projecting from each end, the inner one being seated on the hub and air is first compressed between the pistons and released under undue pressure through the inner piston. The advantage of this construction therefore is that the cushioning devices are neutral above the axle of the wheel and only function when underneath said axle.

Furthermore the advantages of this invention are cheapness of manufacture, simplicity of construction and facilities for attachment or detachment of any of the cushioning devices.

In the accompanying drawings Figure 1 is a side elevation of a wheel with one side disc removed and one cushioning device in section.

Figure 2 is an enlarged section on line II of Figure 1 with spring around cylinder omitted.

Figure 3 is a half elevation, similar to Figure 1 illustrating a modification.

Figure 4 is a section on line IV of Figure 3, the valves being shown diagrammatically, and Figure 5 an enlarged section on line V thereof.

Figure 6 is an enlarged fragmentary section through the tread illustrating a reinforcement thereof.

Figure 7 is an enlarged fragmentary detail illustrating a modification of the discs.

According to the form of the invention shown in Figures 1 and 2 the wheel comprises two discs 1, 2 enclosing air cushioning devices of the piston type and fitted with the tread 3. The discs are fixed on the hub 4 of the axle and bolted by bolts 5 to each other with a space 6 between and formed near their outer edges with scolloped shoulders 7.

In the channel 8 formed between the outer edges of the discs the tread 3 is retained and said tread is formed on its inner circumference with scollops or recesses 9 at regular intervals.

Each air cushioning device consists of a cylinder 10 divided transversely by a partition 11 provided with a retention delivery valve 12 and in the respective ends of the cylinder are hollow pistons 13, 14 both of which project out of said cylinder. The outer end 15 of piston 13 is curved and enlarged to form a head and formed with an air inlet 16 while its inner end is provided with a suction valve 17 and the piston 14 is formed at its inner end with a solid head 18, an air outlet 19 and a relief valve 20 at its outer end.

The outer end of the cylinder 10 is formed with curved shoulders 21 which engage with the shoulders 7 of the discs 1, 2.

When the cylinders are placed in position and both discs secured together the curved shoulders 7 of the discs engage the curved shoulders 21 of the cylinders, the scollops 9 of the tread engage the curved heads 15 of the outer pistons 13 and the projecting heads 18 of the inner pistons 14 are secured by means of bolts 23, between two rings 22 fixed to the hub.

Coiled springs indicated at 24 in Figure 1 are provided between the heads 15 of the pistons 13 and the shoulders 21 of the cylinder 10 to support or outwardly thrust the portion of the tread not in contact with the ground. Furthermore a coil spring 25 may be wrapped around the cylinder as illustrated in Figure 1 and bear at one end against its shoulders 21 and at the other end against the rings 22.

In operation the outward movement of a piston 13 when not under pressure and assisted by spring 25 if used, causes air to be drawn through valve 17 and delivered between piston 13 and partition 11 and upon pressure of piston 13 when the tread is on the ground said air is passed through valve 12 into the space between partition 11 and piston 14 where it cushions. The air when under excessive pressure passes through valve 20 to outlet 19 and the spring of valve 20 can be adjusted to suit the pressure desired.

According to a modification of the invention shown in Figures 3, 4 and 5 an additional cylinder 29 closed at the outer end 30 to act as a piston and provided with a valve 31 is located between the main cylinder 10$^a$ and the inner piston 14$^a$ having an air inlet 20 and the inner end of said cylinder 29 projects beyond the outer cylinder 10$^a$ and is formed with lugs or shoulders 32 that engage scolloped shoulders 33 formed on the sides of the discs 1$^a$ and 2$^a$ near the hub. Around the latter is a ring 34 formed with scollops 35 into which fit and are secured the inner loops 36 of a continuous folded metal strip S the outer loops 37 of which are screwed to the inner plain peripheral surface of the tread. The cushioning devices are placed in the spaces 38 between the folds of the strip S with the end of each piston 14$^a$ seated in a loop 36 and the shoulders 32 of cylinder 29 bearing against shoulders 33 on the discs; also the end of piston 13$^a$ bears against the tread and the shoulders 21$^a$ of the cylinder 10$^a$ bear against the scolloped shoulders 7$^a$ of the discs. By means of this construction any cushioning device can be readily removed or placed in position by removing one disc.

By means of this modified construction both pistons 13$^a$ and 14$^a$ act as air pumps and compress air between the partition 11$^a$ and the end 30 of the cylinder-piston 29, and as a result the cushion devices are double acting.

The tread as in Figure 6 may be moulded of two qualities of rubber, the outer portion 45 being comparatively resilient and the inner portion 41 less resilient and in order to reinforce the tread it may have imbedded within it a metal ring 42 to the respective sides of which are riveted angle section rings 43.

Furthermore, the scolloped inner edge 9 of the tread may be reinforced by a metal band 44 that may be of channel section as illustrated.

As disclosed in the modification illustrated in Fig. 7, in order to maintain the shoulders of the discs 2$^b$ in contact with the shoulders of the main cylinder 21$^b$ the discs are formed with recesses 50 in which are seated blocks 51 the inner portion acting as shoulders which are kept in contact with the shoulders of the main cylinder by means of one or more springs 52 seated in sockets as illustrated.

Having now described my invention what I claim as new and desire to secure by Letters Patent is:—

1. In a resilient wheel of the kind referred to, a series of independent and separately detachable cushioning devices each comprising a transversely divided cylinder with a piston at each end, the inner piston fixed to the hub and the outer piston bearing against the tread and retaining side discs fixed to the hub and formed with shoulders engaging shoulders on the cylinder.

2. In a resilient wheel cushioning devices each comprising a cylinder transversely divided by a partition and having a piston at each end, the inner piston fixed to the hub and the outer piston bearing against one of a series of scollops formed in the tread, retaining side discs fixed to the hub and to each other and formed with scolloped shoulders engaging shoulders on the cylinder and said pistons and cylinder formed with valve and air openings.

3. In a resilient wheel cushioning devices each comprising a cylinder transversely divided by a partition and having a piston at each end, the inner piston fixed to the hub and the outer piston bearing against one of a series of scollops formed in the tread, retaining side discs fixed to the hub and to each other and formed with scolloped shoulders engaging shoulders on the cylinder said outer piston formed with an air inlet and suction valve, the partition with a delivery valve and the inner piston with a relief valve and air outlet.

4. In a resilient wheel, cushioning devices each comprising a cylinder with shoulders and divided transversely with a piston at each end the inner piston fixed to the hub and the outer piston formed with shoulders and bearing against the tread, retaining side discs fixed to the hub and formed with shoulders engaging the shoulders on the cylinder, and springs fitted between the shoulders on the outer piston and cylinder.

Dated this fifth day of September 1923.

VERE HERBERT CASEY.